United States Patent [19]
Slivka et al.

[11] Patent Number: 5,493,649
[45] Date of Patent: Feb. 20, 1996

[54] DETECTING CORRUPTION IN A COMPUTER PROGRAM AT EXECUTION TIME USING A CHECKSUM

[75] Inventors: Benjamin W. Slivka, Clyde Hill; Chuck Strouss, Redmond, both of Wash.

[73] Assignee: Microsoft Corporation, Redmond, Wash.

[21] Appl. No.: 263,064

[22] Filed: Jun. 21, 1994

[51] Int. Cl.⁶ .............................. G06F 11/00; G06F 11/30
[52] U.S. Cl. ................. 395/185.01; 395/185.05; 395/183.14
[58] Field of Search ..................... 380/4, 24, 25; 371/67.1, 47.1, 49.2, 53; 395/185.01, 185.05, 183.13, 183.14

[56] References Cited

U.S. PATENT DOCUMENTS

| | | | |
|---|---|---|---|
| 4,727,544 | 2/1988 | Brunner et al. | 371/21.1 |
| 4,807,186 | 2/1989 | Ohmishi et al. | 364/900 |
| 4,843,633 | 6/1989 | Menich et al. | 455/33 |
| 5,150,368 | 9/1992 | Autruong et al. | 371/5.1 |
| 5,263,152 | 11/1993 | Smith | 395/575 |

*Primary Examiner*—Hoa T. Nguyen
*Attorney, Agent, or Firm*—Seed and Berry

[57] ABSTRACT

A mechanism for detecting corruption of computer programs is provided. In a preferred embodiment of the present invention, a checksum is used to determine when a computer program has been corrupted. Upon initially starting a computer program, a first checksum is calculated for the computer program. When the computer program is requested to perform an operation, a second checksum is calculated for the computer program. Corruption of the computer program is indicated when the first checksum does not equal the second checksum.

21 Claims, 7 Drawing Sheets

DETECTING CORRUPTION IN A COMPUTER PROGRAM AT EXECUTION TIME USING A CHECKSUM

TECHNICAL FIELD

The present invention relates generally to data processing systems and, more particularly, to the detection of corruption within a computer program.

BACKGROUND OF THE INVENTION

Since the earliest days of computing, computer programs have contained bugs. The term "bugs" refers to errors in the computer program that cause the program to malfunction or to produce incorrect results. When a single program is executing within the memory of a computer system, a bug in the computer program will cause the computer program to execute in an undesirable manner. When multiple computer programs are executing within the memory of a computer system, a bug within one computer program may also affect the operations of a different computer program.

Figure 1:
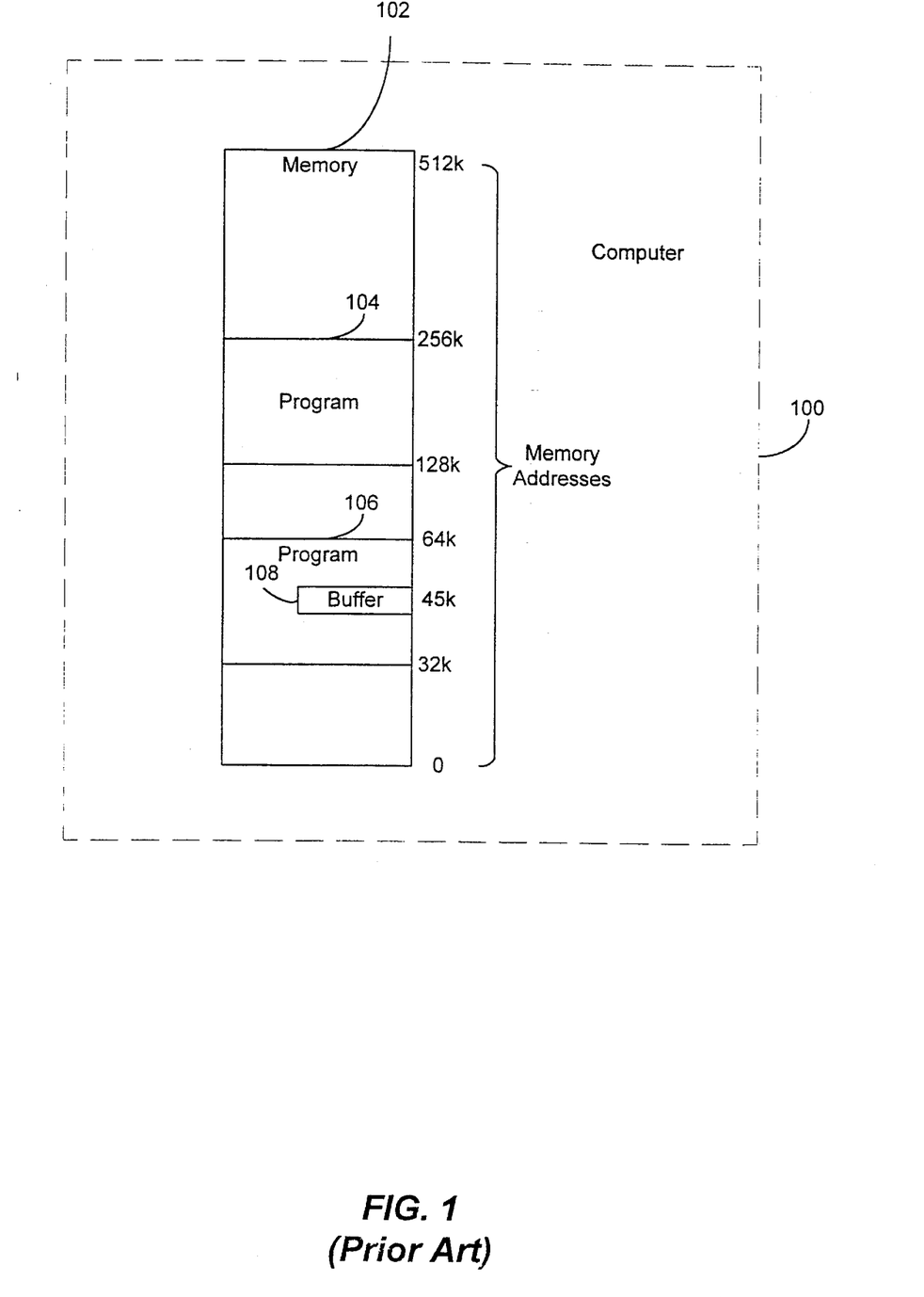
FIG. 1 depicts two computer programs residing within the memory of a computer system.

To illustrate how a bug in one computer program can affect the operations of a different computer program, consider the following example. FIG. 1 depicts two computer programs 104, 106, which reside within the memory 102 of a computer system 100. Program 106 contains a buffer 108 and resides within the memory region of 32k to 64k. The program 106 uses a pointer to reference buffer 108. Program 104 resides within the memory region of 128k to 256k. If computer program 106 stores information into buffer 108 within the local memory space of program 106 at location 45k, there is no effect on program 104. If, however, a bug within program 106 overwrote the pointer to the buffer 108 so that the pointer referred to a memory address between the range of 128K and 256K, a portion of program 104 would be overwritten when program 106 stored the information. Therefore, program 104 would execute in an unanticipated manner.

A bug from one program which affects the processing of a second program can have much more serious effects than illustrated above. If, for example, program 104 manipulated files and program 106 had a bug that overwrote a portion of program 104, then program 104 would behave unexpectedly with regard to the files that program 104 was currently manipulating. While program 104 was manipulating the files, the bug in program 106 may cause program 104 to modify data within the files, delete the files, or corrupt the files so that the files would be rendered unusable. Therefore, when multiple programs are executing within the memory of a computer system, a bug within one program may cause a second program to behave in a destructive manner.

SUMMARY OF THE INVENTION

In a preferred embodiment of the present invention, a method is executed in a computer system having a memory and a computer program. The computer program resides within the memory of the computer system. While the computer program is residing within the memory of the computer system, this method calculates a first checksum for the computer program. Before executing the computer program, this method calculates a second checksum for the computer program and compares the first checksum to the second checksum. When the first checksum does not equal the second checksum, this method indicates that the computer program is corrupted.

In a preferred embodiment, when the first checksum equals the second checksum, a second method recalculates the first checksum so as to reflect the subsequent changes to the computer program after the computer program has been executed.

DETAILED DESCRIPTION OF THE INVENTION

The present invention provides a mechanism whereby corruption of a computer program can be detected. The preferred embodiment helps a computer program detect corruption within itself and halt operation so as to minimize destructive behavior. The preferred embodiment detects corruption within a computer program by calculating a checksum for the computer program. Before the computer program is executed, a second checksum is calculated for the computer program and the first checksum is compared to the second checksum. When the first checksum does not equal the second checksum, this inequality indicates that the computer program has been corrupted.

Figure 2:
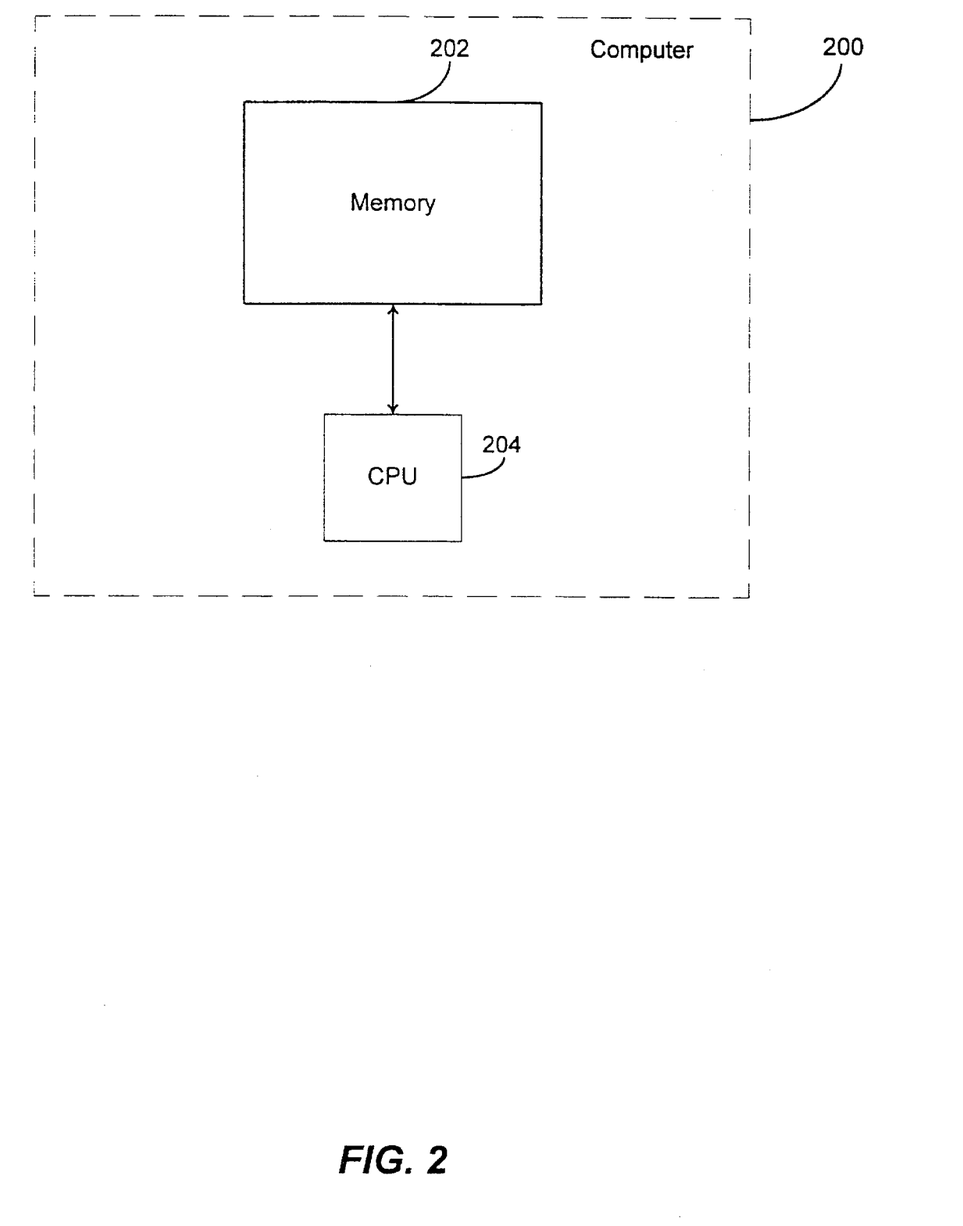
FIG. 2 depicts a block diagram of a computer suitable for practicing a preferred embodiment of the present invention.

FIG. 2 shows a computer system suitable for practicing the preferred embodiment of the present invention. The computer system 200 contains a memory 202 and a central processing unit (CPU) 204. The CPU 204 executes programs that reside within the memory 202 of computer 200.

Figure 3:
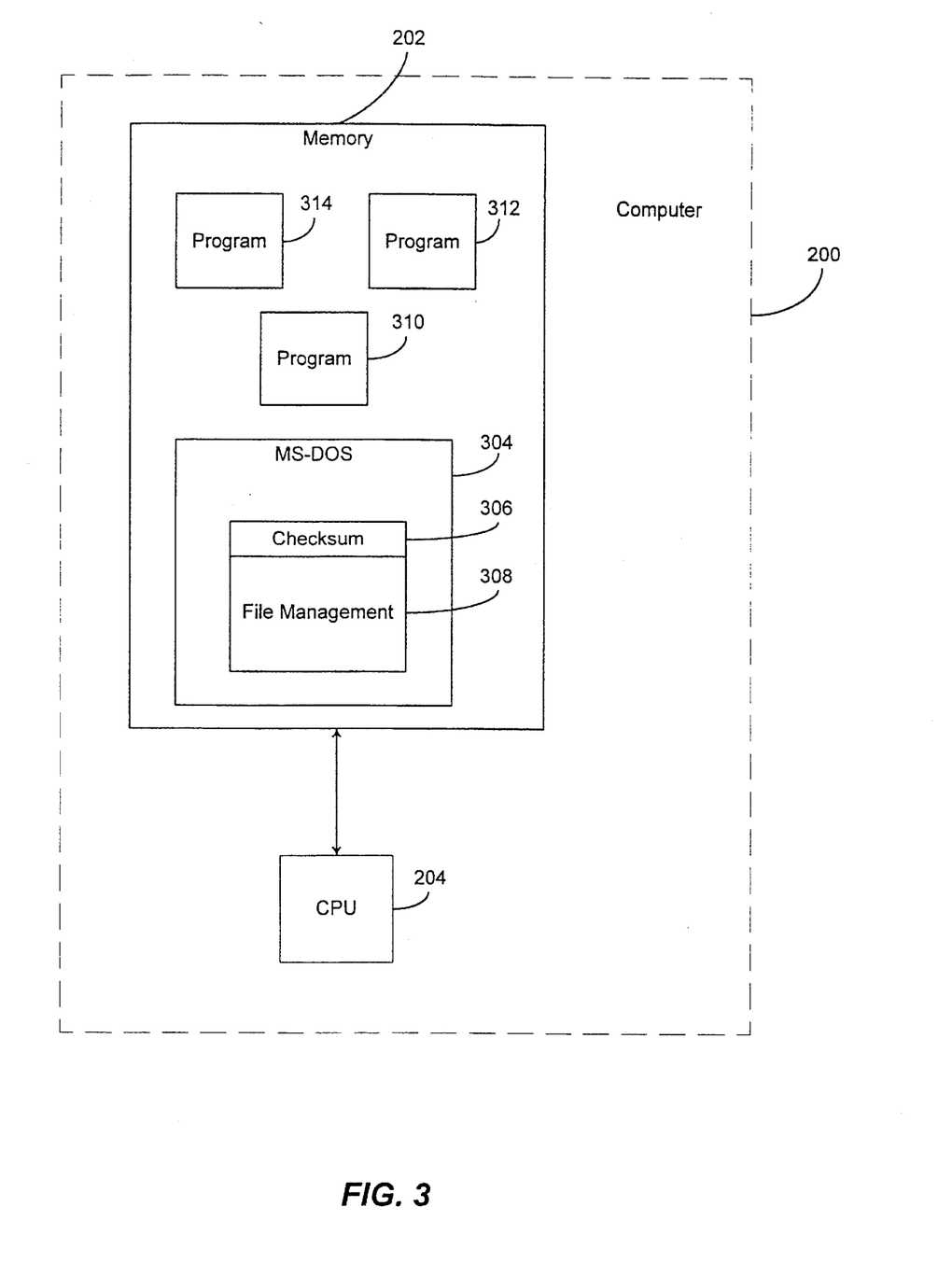
FIG. 3 depicts a more detailed block diagram of a computer suitable for practicing a preferred embodiment of the present invention.

FIG. 3 shows a more detailed block diagram of computer 200. Computer 200 contains a memory 202 and a CPU 204. The memory 202 contains programs 310, 312, 314, and MS-DOS 304. MS-DOS 304 is an operating system for a personal computer and is available from Microsoft Corporation of Redmond, Wash. MS-DOS 304 contains a file management component 308 and a checksum 306 for the file management component 308. The checksum 306 is a value that represents a mathematical computation performed on all of the bytes in the file management component 308. Since the checksum 306 typically varies whenever the file management component 308 is modified, the checksum 306 is used to identify when the file management component 308 has been modified between invocations (i.e., corrupted). The file management component 308 of MS-DOS 304 is responsible for managing all files in the computer system. Therefore, the file management component 308 controls the creation and deletion of files in the computer system as well as controlling access to the files in the computer system. Each computer program 310, 312, 314, MS-DOS 304 and the file management component 308 have a data section and a code section. The code section of a computer program contains the computer instructions that operate upon the data of the computer program. The data section of the computer program contains the data that the instructions of the computer program use for operation.

Although a preferred embodiment of the present invention is described as being implemented on a personal computer, one skilled in the art will recognize that the present invention may be implemented on other computer systems, including, but not limited to, mainframes, workstations, and portables. Further, although a preferred embodiment of the present invention is described as being implemented within the MS-DOS operating system, one skilled in the art will recognize that the present invention may be used with other operating systems. In addition, one skilled in the art will recognize that the present invention could be used with other computer programs that are not part of an operating system.

Figure 4A:
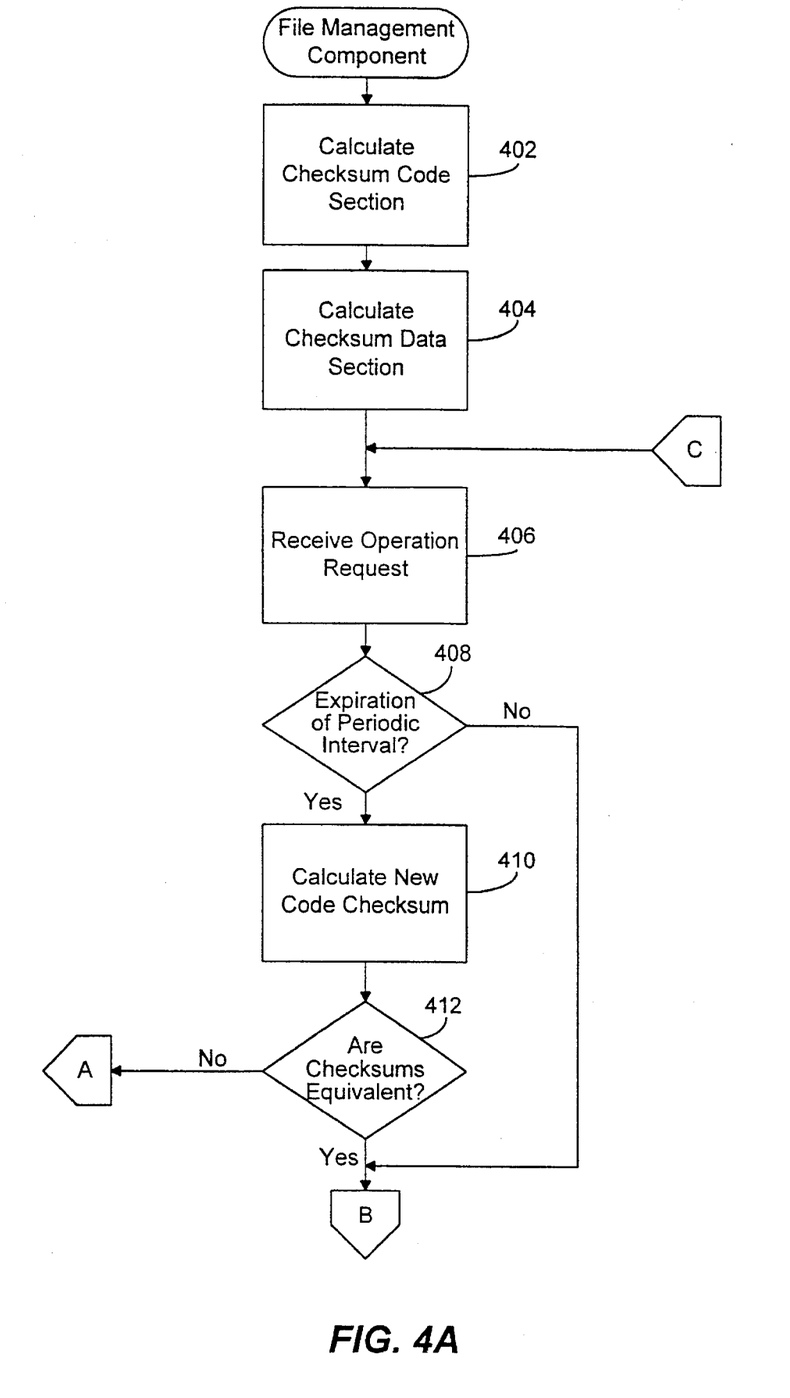
FIGS. 4A and 4B depict a flow chart of steps performed by the file management component of a program residing within the computer.
Figure 4B:
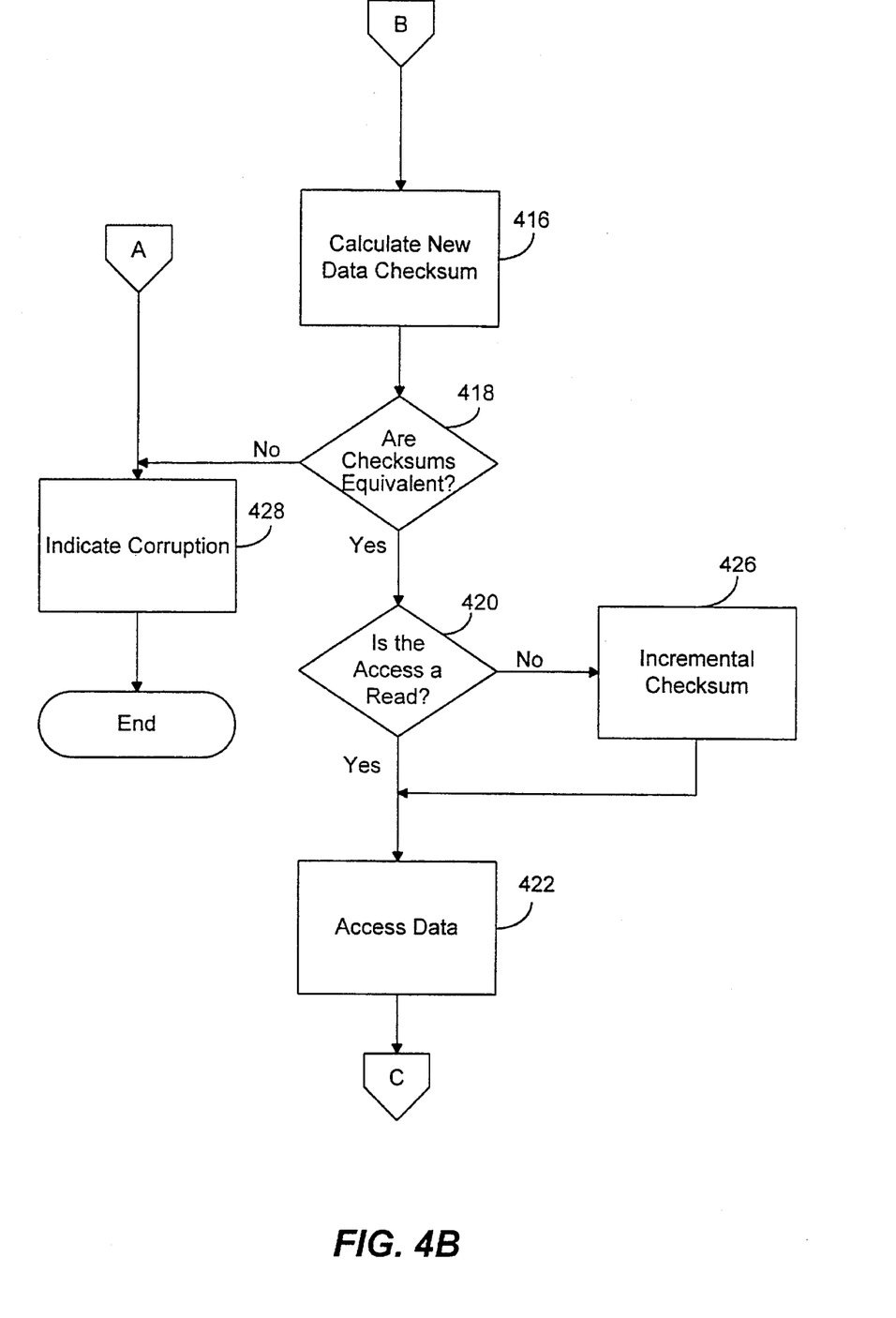

FIGS. 4A and 4B depict a flow chart for the high-level flow of the preferred embodiment of the present invention. In a preferred embodiment, the file management component 308 maintains one checksum for its code section and another checksum for its data section. At certain intervals, the file management component recalculates the checksums to help determine if either the code section or the data section has been overwritten. The file management component preferably recalculates the data checksum each time a request for an operation is received that would read or write to the data section. Upon completion of the operation, the file management component updates the maintained data checksum to reflect updates to the data section. In steps 402 and 404, upon initially starting the file management component (e.g., system startup), the file management component calculates checksums for the code section and the data section of the file management component by invoking the calculate checksum routine. In step 406, the file management component waits until it receives an operation to perform. The file management component, when performing an operation, always executes code as well as either reading from or writing to the data section of the file management component. Since modifications to the code section are very rare, the checksum on the code section of the file management component is preferably not checked upon receipt of every operation request. Therefore, in step 408, the file management component determines whether a periodic interval has elapsed. The periodic interval can be based on timing, count of operations requested, or other suitable events. If the periodic interval has not elapsed, the file management component continues to step 416. However, if the periodic interval has elapsed, in step 410, the file management component calculates a new checksum for the code section by invoking the calculate checksum routine. In step 412, the file management component determines whether both checksums of the code section of the file management component are equivalent. If the checksums are not equivalent, in step 428 the file management component indicates to the computer user that the code section of the file management component has been corrupted and processing ends, before the code is executed. If the two checksums are equivalent, however, processing continues. During performance of the requested operation, the data section of the file management component is accessed. In step 416, the file management component calculates a new checksum for the data section by invoking the calculate checksum routine. In step 418, the file management component determines whether both checksums for the data section of the file management component are equivalent. In step 428, if the checksums are not equivalent, the file management component indicates to the computer user that the data section of the file management component has been corrupted and processing ends. If the checksums are equivalent, processing continues. In step 420, the file management component determines whether access to the data section is for a read or for a write. If access to the data section is for a write, in step 426, an incremental checksum is calculated for the data section by invoking the incremental checksum routine. If, however, the access to the data section is a read, since the data section will not be modified, the checksum for the data section of the file management component does not need to be updated, and processing continues. In step 422, the file management component performs the operation by accessing the data section and continues to step 406 to receive a requested operation.

Figure 5:
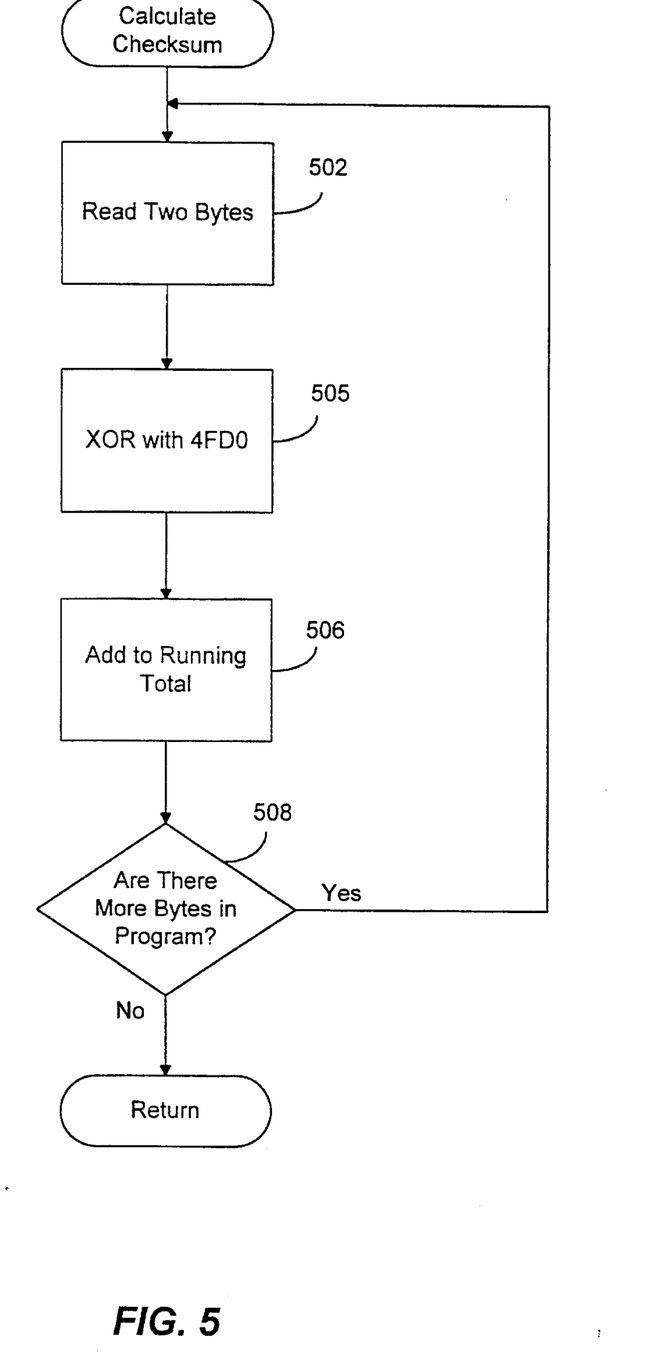
FIG. 5 depicts a flow chart of the steps performed by a calculate checksum routine of the file management component.

FIG. 5 depicts a flow chart for the calculate checksum routine. The calculate checksum routine calculates a checksum for a computer program, a section of a computer program such as the code section or the data section, or generally an area of memory. The calculate checksum routine is passed a pointer to an area of memory and returns the checksum. Although the calculate checksum function is described as a routine, one skilled in the art would appreciate that its functionality may be implemented in-line. In step 502, the calculate checksum routine first reads two bytes from the area of memory. In step 505, the two bytes are exclusively-ORed ("xORed") with the hexadecimal value "4FD0." The hexadecimal value 4FD0 (0100111111010000) is used to distinguish 0000 from FFFF. In one's complement arithmetic, zero can be expressed as a positive or a negative value. Zero in the positive form is 0000 and zero in the negative form is FFFF. Thus, using one's complement arithmetic, 0000 is equivalent to FFFF. Therefore, for example, if an error were to occur that toggled all of the bits in a memory location and that memory location contained either 0000 or FFFF, the memory error would be undetected. The present invention solves this problem by utilizing 4FD0 so as to distinguish 0000 and FFFF. Those skilled in the art will recognize that other values besides 4FD0 can be used. In step 506, the result of step 505 is added to a running total, using one's complement addition. That is, both numbers are interpreted as one's complement numbers. Initially upon invoking the calculate checksum routine, the running total is initialized to zero. In step 508, the calculate checksum routine determines if there are more bytes in the area of memory to be processed. If there are more bytes to be processed, then the calculate checksum routine continues to step 502. Otherwise, if there are no more bytes to be processed, the running total is the checksum for the area of memory and the routine returns.

Figure 6:
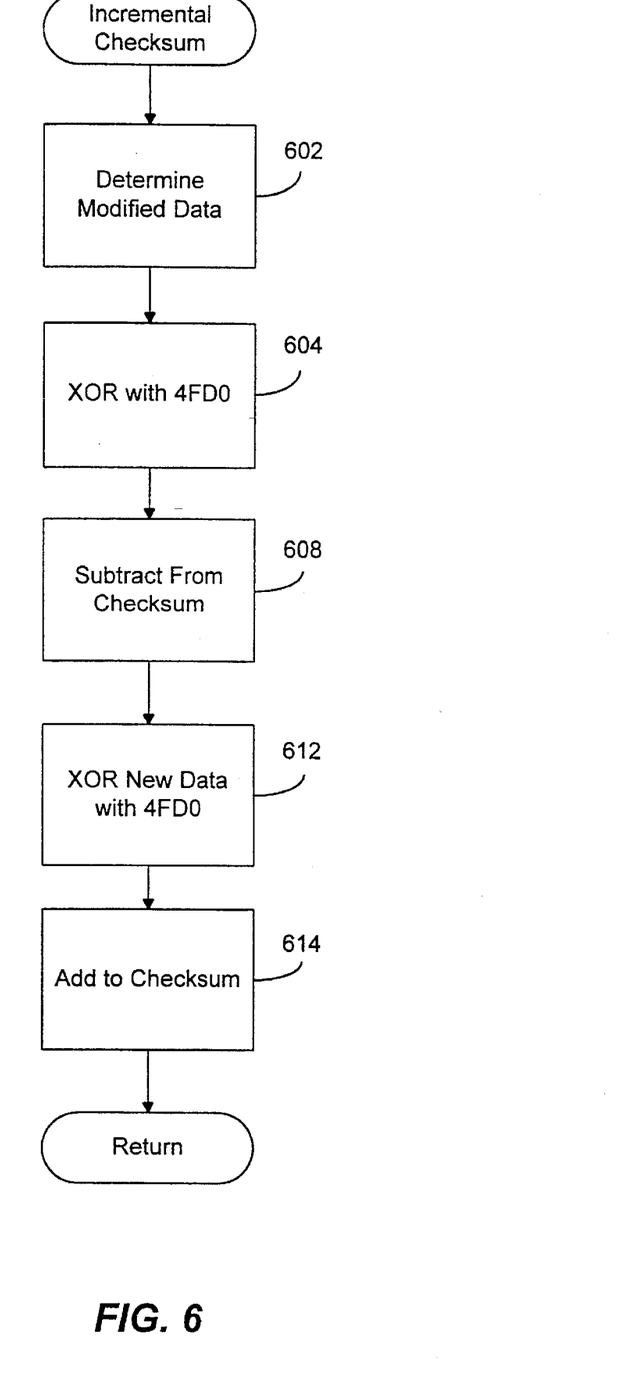
FIG. 6 depicts a flow chart of the steps performed by the incremental checksum routine of the file management component.

FIG. 6 depicts a flowchart for the incremental checksum routine of the preferred embodiment. The incremental checksum routine provides a fast and efficient method for updating a checksum. Instead of calculating a checksum the way that the calculate checksum routine does, the incremental checksum routine adjusts the checksum to account for a subsequent modification by subtracting the data to be overwritten from the checksum and adding the overwriting ("new") data to the checksum. In step 602, the preferred embodiment determines which data is to be modified. In step 604, the preferred embodiment "exclusively-ORs" the data to be overwritten with the hexadecimal value 4FD0. In step 608, the value received from step 604 is subtracted from the checksum using one's complement subtraction where both numbers are interpreted as one's complement numbers. In step 612, the new data is exclusively-ORed with the hexadecimal value 4FD0. In step 614, the value received from step 612 is added to the existing checksum using one's complement addition to create a new checksum.

The preferred embodiment of the present invention provides a method and system for allowing a computer program to determine if the computer program has been corrupted. Upon detecting corruption within the computer program, the computer program halts operation. Thus, the computer program prevents both bugs within the computer program and bugs within other computer programs to force the computer program to behave in an undesirable or destructive manner.

While the present invention has been described with reference to a preferred embodiment thereof, those skilled in the art will know of various changes in form that may be made without departing from the spirit and scope of the claimed invention as defined in the appended claims. For example, one skilled in the art would appreciate that multiple checksums can be maintained for separate portions of the data section. The separate portions preferably correspond to data not accessed during a single operation. The smaller size of the separate portions also reduces the time needed to recalculate the checksum. Also, various other well-known checksum techniques may be used. Although a preferred embodiment has been described in terms of a computer program calculating a checksum for its own code section and data section, one skilled in the art would appreciate that one computer program could calculate the checksum of another computer program before invoking the other computer program.

We claim:

1. A method in a computer system for detecting corruption of a computer program, the computer system having a memory containing the computer program, wherein the computer program receives requests to perform operations and performs the operations, comprising the steps of:

loading the computer program into the memory;

initiating execution of the computer program;

during the execution of the computer program, calculating a first checksum for the computer program, for each of a plurality of requests, receiving the request to perform an operation by the computer program;

calculating a second checksum for the computer program in response to said step of receiving the request to perform the operation by the computer program; and comparing the first checksum to the second checksum wherein when the first checksum does not equal the second checksum, then the computer program has been corrupted.

2. The method of claim 1 including the steps of when the first checksum equals the second checksum, performing the operation by the computer program wherein the computer program undergoes changes and recalculating the first checksum so as to reflect the changes to the computer program when performing the operation.

3. The method of claim 2 wherein the computer program contains data, wherein the step of performing the operation overwrites the data with new data, and wherein the step of recalculating the first checksum includes the step of incrementally recalculating the first checksum based on the data that is overwritten and the new data.

4. The method of claim 1 wherein the computer system has a user, further including the step of when the computer program has been corrupted, notifying the user of the computer program corruption.

5. A method in a computer system for detecting corruption in an operating system, the computer system having a memory containing the operating system, wherein the operating system receives requests to perform operations and performs the operations, the operating system having contents, comprising the steps of:

loading the operating system into the memory;

initiating execution of the operating system;

during the execution of the operating system, creating a first identifier based on the contents of the operating system; for each of plurality of requests, receiving the request to perform an operation by the operating system;

creating a second identifier based on the contents of the operating system in response to the received request; and comparing the first identifier to the second identifier wherein when the first identifier does not equal the second identifier, then the operating system has been corrupted.

6. The method of claim 5 wherein the first and second identifiers are created based on a code portion of the operating system.

7. The method of claim 5 wherein the first and second identifiers are created based on a data portion of the operating system.

8. The method of claim 5 including the steps of when the first identifier equals the second identifier, performing the operation by the operating system wherein the operating system undergoes changes and recreating the first identifier so as to reflect the changes to the operating system when performing the operation.

9. The method of claim 5 wherein the first identifier indicates a first checksum of the operating system and wherein the second identifier indicates a second checksum of the operating system.

10. The method of claim 5 wherein the computer system has a user, further including the step of notifying the user of the operating system corruption when the operating system is corrupted.

11. A method in a computer system for performing an operation in a computer program, the computer system having a memory containing the computer program, the computer program having a data section and a code section, wherein the computer program receives requests to perform operations and wherein the computer program performs operations which access the code section and the data section, comprising the steps of:

loading the computer program into the memory;

initiating execution of the computer program;

during the execution of the computer program, calculating a first data checksum for the data section of the computer program;

calculating a first code checksum for the code section of the computer program; for each of a plurality of requests, receiving the request to perform an operation;

determining if performing the operation will access the code section and the data section;

if performing the operation will access the code section of the computer program then, calculating a second code checksum for the code section of the computer program; and comparing the first code checksum to the second code checksum wherein if the first code checksum does not equal the second code checksum, then the code section of the computer program has been corrupted; and if performing the operation will access the dam section of the computer program, calculating a second data checksum for the data section of the computer program; and comparing the first data checksum to the second data checksum wherein if the first data checksum does not equal the second data checksum, then the data section of the computer program has been corrupted.

12. The method of claim 11 wherein the data section contains data, including the steps of performing the operation and when the step of performing the operation modifies data in the data section, recalculating the first data checksum so as to reflect the modifications to the data.

13. The method of claim 11 wherein the step of comparing the first data checksum includes the step of when the first data checksum does not equal the second data checksum, halting the computer program.

14. The method of claim 11 wherein the step of comparing the first code checksum includes the step of when the first code checksum does not equal the second code checksum, halting the computer program.

15. A computer system comprising:

a processor for executing a computer program;

a memory containing the computer program that is being executed by the processor for receiving requests to perform operations and for performing the operations;

means for receiving a request to perform an operation by the computer program;

a checksum component for calculating a first checksum on the computer program before receiving a request to perform an operation and for calculating a second checksum on the computer program after receiving the request to perform the operation while the computer program is executing; and a comparison component for comparing the first checksum and the second checksum in response to receiving the request to perform the operation by the computer program and for indicating that the first checksum does not equal the second checksum.

16. The computer system of claim 15 wherein the comparison component halts the computer program when the first checksum does not equal the second checksum.

17. A method in a computer system for detecting corruption of a computer program, the computer system having a memory containing the computer program, comprising the steps of:

loading the computer program into the memory;

initiating execution of the computer program;

during the execution of the computer program,
calculating a first checksum for the computer program;
determining when a periodic interval has expired; and
when it is determined that the periodic interval has expired,
calculating a second checksum for the computer program; and comparing the first checksum to the second checksum wherein when the first checksum does not equal the second checksum, then the computer program has been corrupted.

18. The method of claim 17 wherein the periodic interval is created based on a predetermined amount of time and wherein the step of determining when a periodic interval has expired includes the step of determining when the predetermined amount of time has expired.

19. The method of claim 17 wherein the computer program performs operations and receives requests to perform the operations, wherein the periodic interval is created based on a predefined number of requests of operations, and wherein the step of determining when a periodic interval has expired includes the step of determining when the predefined number of requests of operations has occurred.

20. A method in a computer system for detecting corruption of a computer program, the computer system having a memory containing the computer program, comprising the steps of:

loading the computer program into the memory;

initiating execution of the computer program;

during the execution of the computer program,
under the control of the computer program,
calculating a first checksum for the computer program;
determining when a periodic interval has expired; and
when the computer program determines that the periodic interval has expired,
calculating a second checksum for the computer program; and
comparing the first checksum to the second checksum, wherein the first checksum does not equal the second checksum, then the computer program has been corrupted.

21. A method in a computer system for detecting corruption of a computer program, the computer program having a descriptor, wherein the computer program receives requests to perform operations and performs the operations, comprising the steps of:

loading the computer program into the memory;

initiating execution of the computer program;

during the execution of the computer program, creating a first descriptor based on the contents of the computer program; for each of a plurality of requests,
receiving the request to perform an operation by the computer program;
creating a second descriptor based on the contents of the computer program in response to the step of receiving the request; and
comparing the first descriptor to the second descriptor, wherein when the first descriptor does not equal the second descriptor, then the computer program has been corrupted.

* * * * *

UNITED STATES PATENT AND TRADEMARK OFFICE
CERTIFICATE OF CORRECTION

PATENT NO. : 5,493,649
DATED : February 20, 1996
INVENTOR(S) : Benjamin W. Slivka and Chuck Strouss It is certified that error appears in the above-indentified patent and that said Letters Patent is hereby corrected as shown below:

In column 5, claim 1, line 30, following "detecting", please insert --the--.

In column 5, claim 1, line 38, please delete "," and insert therefor --;--.

In column 5, claim 1, lines 39 to 46, that portion of the claim which reads:

>  for each of a plurality of requests,
> receiving the request to perform an operation by the
>    computer program;
> calculating a second checksum for the computer pro-
>    gram in response to said step of receiving the request
>    to perform the operation by the computer program;
>    and
> comparing the first checksum to the second checksum should have the following indentation:

> for each of a plurality of requests,
>    receiving the request to perform an operation by the
> computer program;
>    calculating a second checksum for the computer pro-
> gram in response to said step of receiving the request
> to perform the operation by the computer program;
> and
>    comparing the first checksum to the second checksum

UNITED STATES PATENT AND TRADEMARK OFFICE
CERTIFICATE OF CORRECTION

PATENT NO. : 5,493,649

DATED : February 20, 1996

INVENTOR(S) : Benjamin W. Slivka and Chuck Strouss

It is certified that error appears in the above-indentified patent and that said Letters Patent is hereby corrected as shown below:

In column 6, claim 5, line 9, following "each of", please insert --a--.

In column 6, claim 5, lines 9 to 15, that portion of the claim which reads:

operating system; for each of plurality of requests,
  receiving the request to perform an operation by the
    operating system;
  creating a second identifier based on the contents of the
    operating system in response to the received request;
    and
  comparing the first identifier to the second identifier should have the following indentation:

operating system;
for each of plurality of requests,
    receiving the request to perform an operation by the
operating system;
    creating a second identifier based on the contents of the
operating system in response to the received request;
and
    comparing the first identifier to the second identifier

UNITED STATES PATENT AND TRADEMARK OFFICE
CERTIFICATE OF CORRECTION

PATENT NO. : 5,493,649
DATED : February 20, 1996
INVENTOR(S) : Benjamin W. Slivka and Chuck Strouss It is certified that error appears in the above-indentified patent and that said Letters Patent is hereby corrected as shown below:

In column 6, claim 11, lines 55 to 62, that portion of the claim which reads:

> receiving the request to perform an operation;
> determining if performing the operation will access the
>   code section and the data section;
> if performing the operation will access the code section
>   of the computer program then,
> calculating a second code checksum for the code sec-
>   tion of the computer program; and
> comparing the first code checksum to the second code should have the following indentation:

> receiving the request to perform an operation;
> determining if performing the operation will access the
> code section and the data section;
>   if performing the operation will access the code section
> of the computer program then,
>       calculating a second code checksum for the code sec-
>   tion of the computer program; and
>           comparing the first code checksum to the second code In column 7, claim 11, line 1, please delete "dam" and insert therefor --data--.

UNITED STATES PATENT AND TRADEMARK OFFICE
CERTIFICATE OF CORRECTION

PATENT NO. : 5,493,649
DATED : February 20, 1996
INVENTOR(S) : Benjamin W. Slivka adn Chuck Strouss It is certified that error appears in the above-indentified patent and that said Letters Patent is hereby corrected as shown below:

In column 7, claim 11, lines 1 to 5, that portion of the claim which reads:

if performing the operation will access the dam section
        of the computer program,
    calculating a second data check sum for the data section
        of the computer program; and
    comparing the first data checksum to the second data should have the following indentation:

if performing the operation will access the dam section
of the computer program,
            calculating a second data check sum for the data section
of the computer program; and
            comparing the first data checksum to the second data In column 7, claim 17, lines 54 and 55, that portion of the claim which reads:

calculating a second checksum for the computer pro-
        gram; and should have the following indentation:

calculating a second checksum for the computer pro-
    gram; and

UNITED STATES PATENT AND TRADEMARK OFFICE
CERTIFICATE OF CORRECTION

PATENT NO. : 5,493,649  
DATED : February 20, 1996  
INVENTOR(S) : Benjamin W. Slivka and Chuck Strouss Page 5 of 7

It is certified that error appears in the above-indentified patent and that said Letters Patent is hereby corrected as shown below:

In column 8, claim 17, line 1, that portion of the claim which reads:

comparing the first checksum to the second checksum should have the following indentation:

comparing the first checksum to the second checksum In column 8, claim 20, lines 25 to 31, that portion of the claim which reads:

calculating a first checksum for the computer program;  
    determining when a periodic interval has expiried; and  
    when the computer program determines that the peri-  
        odic interval has expiried,  
    calculating a second checksum for the computer pro-  
        gram; and  
    comparing the first checksum to the second checksum should have the following indentation:

calculating a first checksum for the computer program;  
        determining when a periodic interval has expiried; and  
        when the computer program determines that the peri-  
odic interval has expiried,  
            calculating a second checksum for the computer pro-  
        gram; and  
            comparing the first checksum to the second checksum

UNITED STATES PATENT AND TRADEMARK OFFICE
CERTIFICATE OF CORRECTION

PATENT NO. : 5,493,649
DATED : February 20, 1996
INVENTOR(S) : Benjamin W. Slivka and Chuck Strouss It is certified that error appears in the above-indentified patent and that said Letters Patent is hereby corrected as shown below:

In column 8, claim 21, lines 43 to 50, that portion of the claim which reads:

> creating a first descriptor based on the contents of the
>   computer program; for each of a plurality of requests,
>   receiving the request to perform an operation by the
>   computer program;
> creating a second descriptor based on the contents of
>   the computer program in response to the step of
>   receiving the request; and
> comparing the first descriptor to the second descriptor

UNITED STATES PATENT AND TRADEMARK OFFICE
CERTIFICATE OF CORRECTION

PATENT NO. : 5,493,649
DATED : February 20, 1996
INVENTOR(S) : Benjamin W. Slivka and Chuck Strouss It is certified that error appears in the above-indentified patent and that said Letters Patent is hereby corrected as shown below:

Cont.

should have the following indentation:

creating a first descriptor based on the contents of the
computer program;
    for each of a plurality of requests,
        receiving the request to perform an operation by the
computer program;
        creating a second descriptor based on the contents of
the computer program in response to the step of
receiving the request; and
        comparing the first descriptor to the second descriptor Signed and Sealed this Eleventh Day of June, 1996

*Attest:*

BRUCE LEHMAN

*Attesting Officer*     *Commissioner of Patents and Trademarks*